(12) United States Patent
Venugopal et al.

(10) Patent No.: US 10,897,752 B2
(45) Date of Patent: Jan. 19, 2021

(54) METHODS AND APPARATUS TO FACILITATE SPATIAL RELATION INDICATION FOR UPLINK CONTROL CHANNEL AND SOUNDING REFERENCE SIGNALS

(71) Applicant: QUALCOMM Incorporated, San Diego, CA (US)

(72) Inventors: Kiran Venugopal, Raritan, NJ (US); Yan Zhou, San Diego, CA (US); Tianyang Bai, Bridgewater, NJ (US); Jung Ho Ryu, Fort Lee, NJ (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/781,784

(22) Filed: Feb. 4, 2020

(65) Prior Publication Data

US 2020/0396731 A1     Dec. 17, 2020

Related U.S. Application Data

(60) Provisional application No. 62/861,882, filed on Jun. 14, 2019.

(51) Int. Cl.
*H04W 72/04*     (2009.01)
*H04L 5/00*     (2006.01)

(52) U.S. Cl.
CPC ....... *H04W 72/0413* (2013.01); *H04L 5/0048* (2013.01); *H04W 72/042* (2013.01)

(58) Field of Classification Search
CPC ............ H04W 72/0413; H04W 72/042; H04L 5/0048
See application file for complete search history.

(56) References Cited

U.S. PATENT DOCUMENTS

| | | | |
|---|---|---|---|
| 2018/0343653 A1* | 11/2018 | Guo | H04L 5/0053 |
| 2019/0074882 A1* | 3/2019 | Zhou | H04L 5/005 |
| 2020/0059898 A1* | 2/2020 | Osawa | H04W 74/0833 |
| 2020/0145079 A1* | 5/2020 | Marinier | H04W 74/0833 |

* cited by examiner

*Primary Examiner* — Ricky Q Ngo
*Assistant Examiner* — Stephen N Steiner
(74) *Attorney, Agent, or Firm* — Procopio, Cory, Hargreaves & Savitch LLP

(57) ABSTRACT

Apparatus, methods, and computer-readable media for facilitating spatial relation indication for uplink control channels and SRS are disclosed herein. An example method for wireless communication at a UE includes determining, based on a rule, a default uplink transmit beam for transmitting an uplink transmission when an uplink transmit beam is not configured by a base station for the uplink transmission. The example method also includes transmitting, to the base station, the uplink transmission on the default uplink transmit beam.

26 Claims, 14 Drawing Sheets

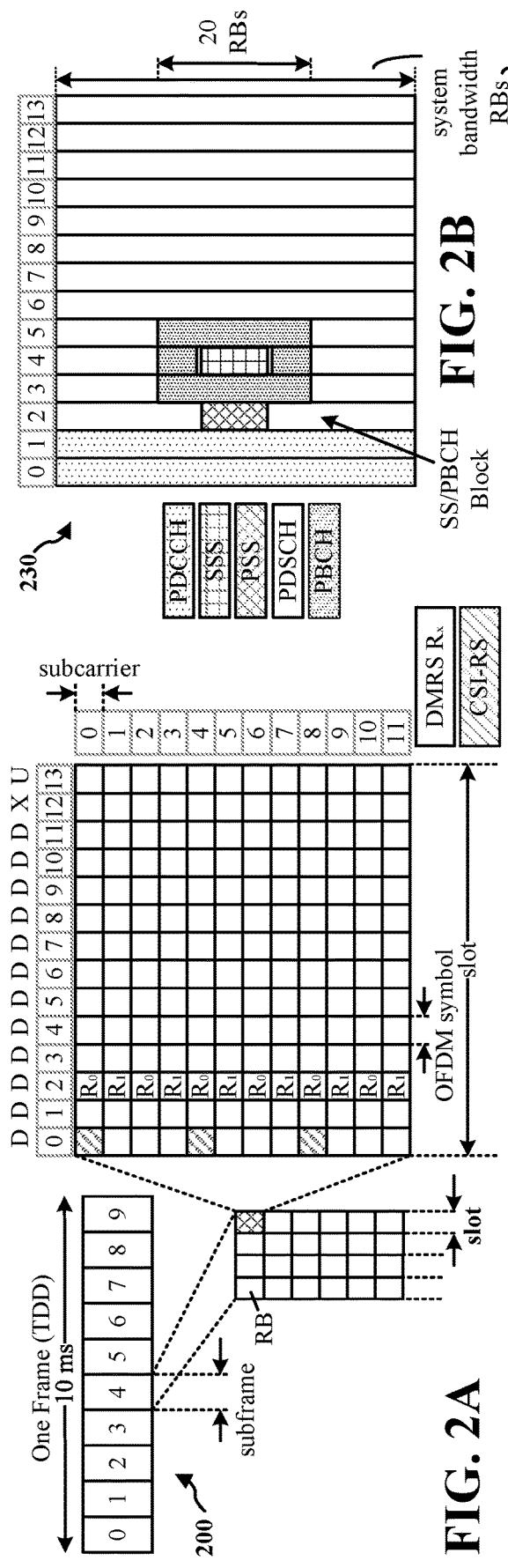
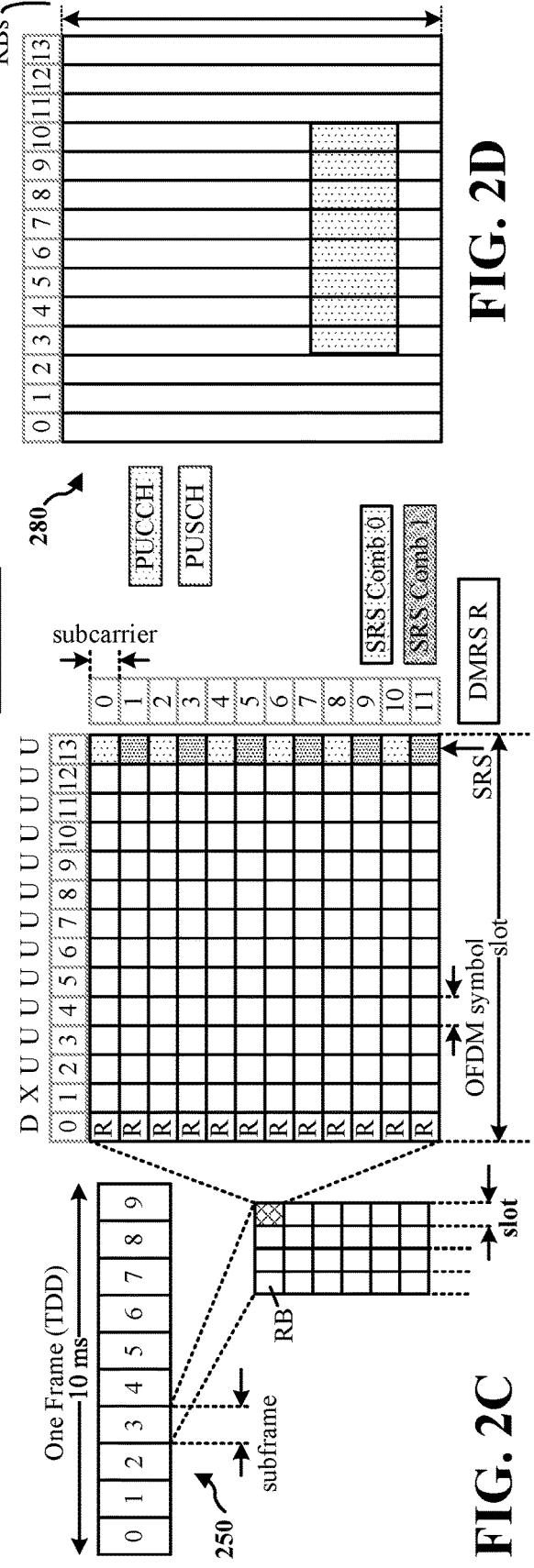
FIG. 2A  FIG. 2B  FIG. 2C  FIG. 2D

METHODS AND APPARATUS TO FACILITATE SPATIAL RELATION INDICATION FOR UPLINK CONTROL CHANNEL AND SOUNDING REFERENCE SIGNALS

CROSS REFERENCE TO RELATED APPLICATION(S)

This application claims the benefit of U.S. Patent Provisional Application Ser. No. 62/861,882, entitled "METHODS AND APPARATUS TO FACILITATE SPATIAL RELATION INDICATION FOR UPLINK CONTROL CHANNEL AND SOUNDING REFERENCE SIGNALS" and filed on Jun. 14, 2019, which is expressly incorporated by reference herein in its entirety.

BACKGROUND

Technical Field

The present disclosure relates generally to communication systems, and more particularly, to communication systems utilizing beams.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. An example apparatus for wireless communication at a user equipment (UE) determines, based on a rule, a default uplink transmit beam for transmitting an uplink transmission when an uplink transmit beam is not configured by a base station for the uplink transmission. The example apparatus also transmits, to a base station, the uplink transmission on the default uplink transmit beam.

In another aspect of the disclosure, a method, a computer-readable medium, and an apparatus are provided. An example apparatus for wireless communication at a base station transmits, to a user equipment (UE), a downlink transmission on a downlink beam. The example apparatus also receives, from the UE, an uplink transmission on a default uplink transmit beam when the base station has not configured an uplink transmit beam for the uplink transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
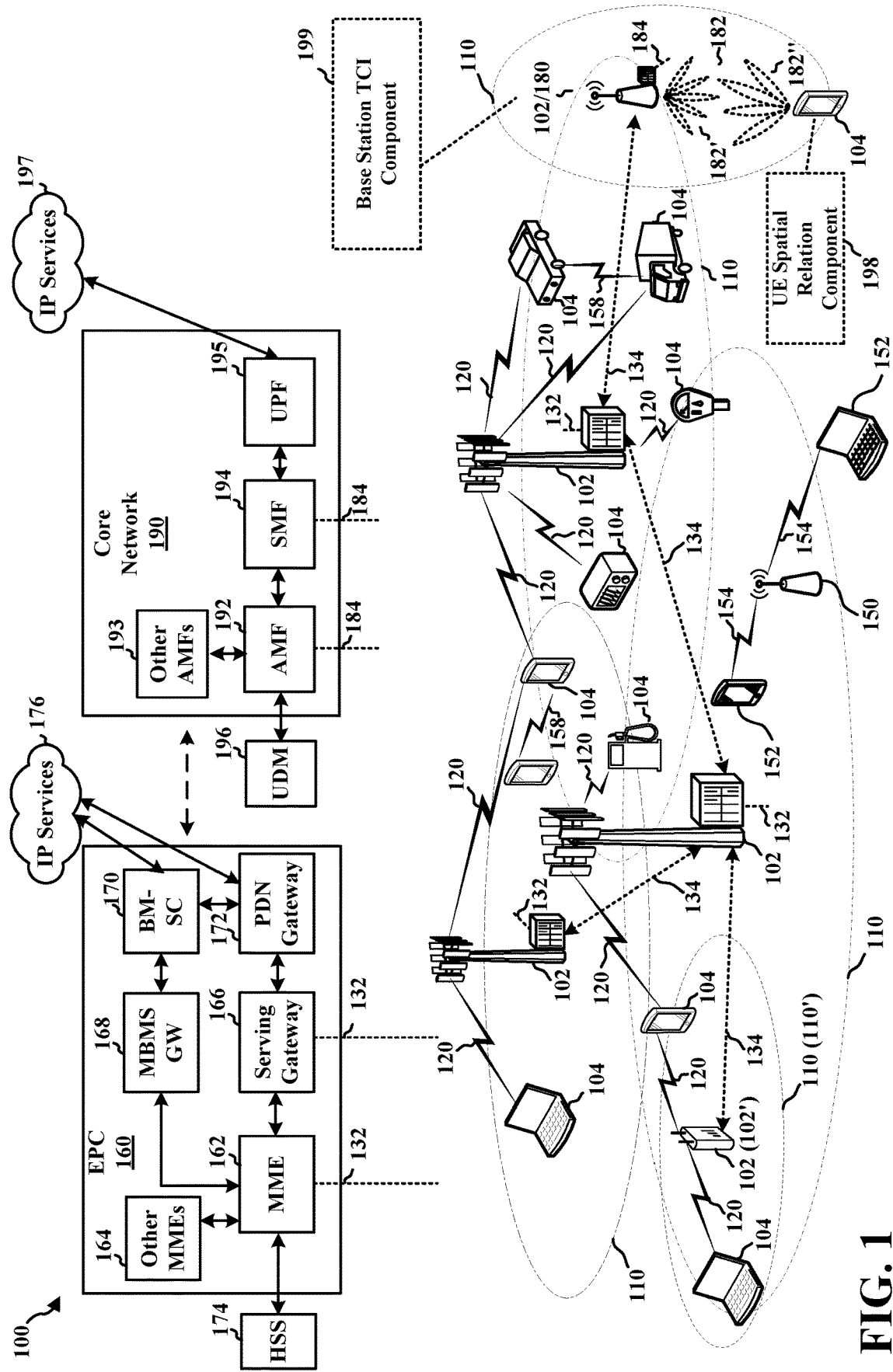
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" are used interchangeably.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to manage one or more aspects of wireless communication via determining a default spatial relation for an uplink control channel and/or SRS. As an example, in FIG. 1, the UE 104 may include a UE spatial relation component 198 configured to determine, based on a rule, a default uplink transmit beam for transmitting an uplink transmission when an uplink transmit beam is not configured by a base station for the uplink transmission. The UE spatial relation component 198 may also be configured to transmit, to the base station, the uplink transmission on the default uplink transmit beam.

Still referring to FIG. 1, in certain aspects, the base station 180 may be configured to manage one or more aspects of wireless communication via monitoring a default spatial relation for an uplink control channel and/or SRS. As an example, in FIG. 1, the base station 180 may include a base station transmission configuration indication (TCI) component 199 configured to transmit, to a user equipment (UE), a downlink transmission on a downlink beam. The example base station TCI component 199 may also be configured to receive, from the UE, an uplink transmission on a default uplink transmit beam when the base station has not configured an uplink transmit beam for the uplink transmission.

As used herein, the term "spatial relation" may be used to refer to UE-side information, while the term "TCI" may be used to refer to base station-side information. However, in some examples, the terms "spatial relation" and "TCI" may be used interchangeably.

Although the following description is focused on uplink communications, the concepts described herein may be applicable to downlink communications and/or sidelink communications. Furthermore, although the following description may be focused on 5G/NR, the concepts described herein may be applicable to other similar areas, such as LTE, LTE-A, CDMA, GSM, and/or other wireless technologies, in which a default spatial relation for uplink control channels and/or SRS may improve communications. For example, the techniques disclosed herein facilitate reducing signaling overhead and facilitate efficient beam management.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIGs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
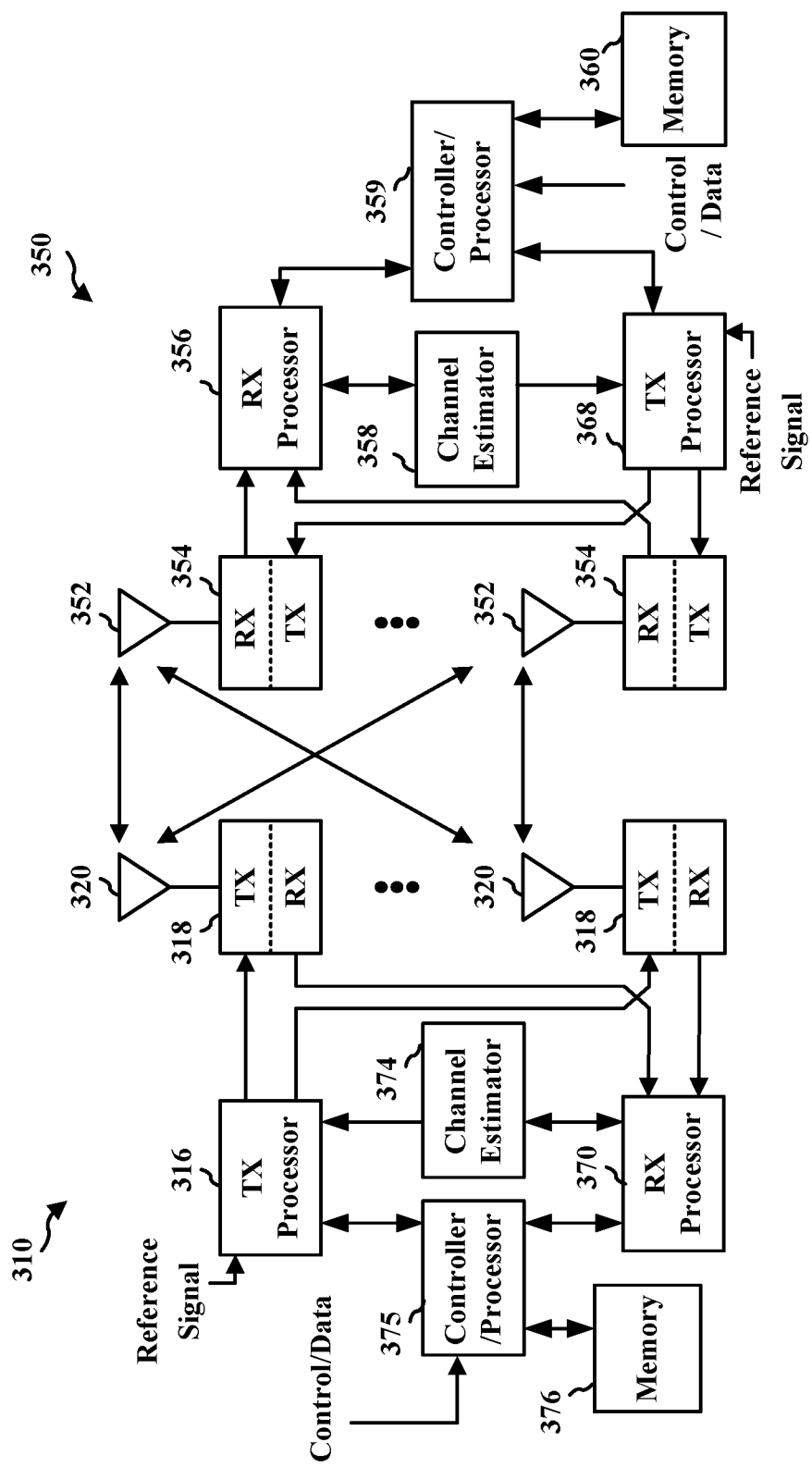
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE spatial relation component 198 of FIG. 1.

At least one of the TX processor 316, the RX processor 370, and the controller/processor 375 may be configured to perform aspects in connection with the base station TCI component 199 of FIG. 1.

Example techniques disclosed herein enable a UE to determine a default uplink transmit beam for transmitting an uplink transmission when an uplink transmit beam is not configured by a base station for the uplink transmission (e.g., the uplink transmit beam is not explicitly configured by the base station). For example, to reduce signaling overhead, spatial relation information may be an optional parameter for an uplink transmission (e.g., PUCCH and/or SRS) and, thus, may not be explicitly configured by the base station for the UE in, for example, RRC signaling. In the absence of an explicit configuration of the spatial relation information from the base station, techniques disclosed herein enable the UE to implicitly determine a default uplink transmit beam for transmitting an uplink transmission. For example, the UE may apply one or more rules to determine the default uplink transmit beam for transmitting an uplink transmission. The UE may then transmit the uplink transmission on the default uplink transmit beam. By providing a way for the UE to determine the default uplink transmit beam without a configuration for the default uplink transmit beam may help to reduce signaling overhead (e.g., between the UE and a base station) for a more efficient use of wireless resources.

Figure 4:
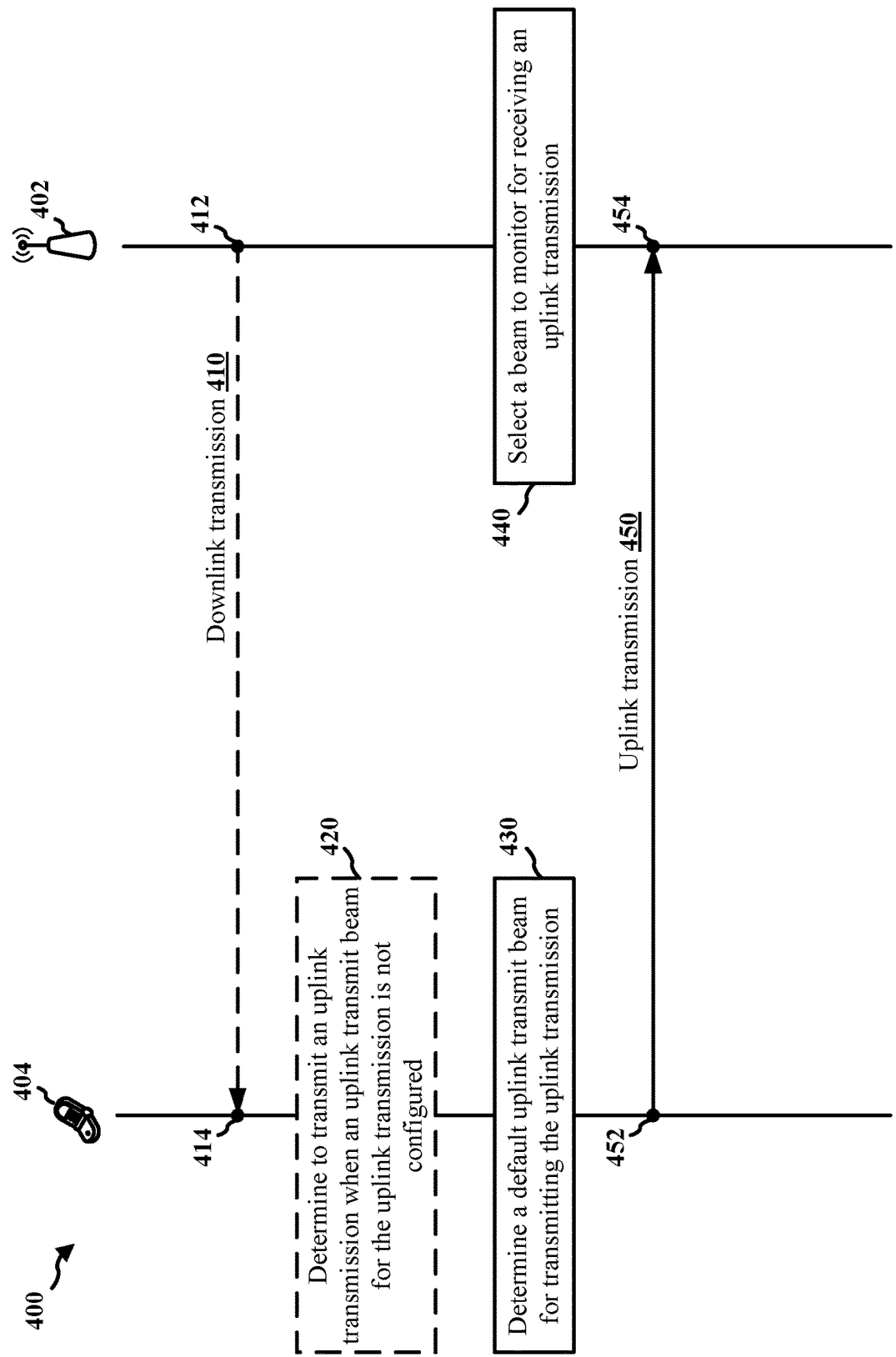
FIG. 4 is an example communication flow between a base station and a UE, in accordance with the teachings disclosed herein.

FIG. 4 illustrates an example wireless communication 400 between a base station 402 and a UE 404, as presented herein. One or more aspects of the base station 402 may be implemented by the base station 102/180 of FIG. 1 and/or the base station 310 of FIG. 3. One or more aspects of the UE 404 may be implemented by the UE 104 of FIG. 1 and/or the UE 350 of FIG. 3.

While the wireless communication 400 of FIG. 4 includes one base station 402 in communication with one UE 404, in additional or alternative examples, the base station 402 may be in communication with any suitable quantity of UEs and/or other base stations, and/or the UE 404 may be in communication with any suitable quantity of base stations and/or other UEs. Thus, while certain of the transmissions between the base station 402 and the UE 404 are described as uplink transmissions and downlink transmissions, in other examples, any of the transmissions may additionally or alternatively be sidelink transmissions.

In the illustrated example, the base station 402 and the UE 404 are in communication. For example, the base station 402 may transmit a downlink transmission 410 that is received by the UE 404. The downlink transmission 410 may be a downlink shared channel (e.g., PDSCH) and/or a downlink control channel (e.g., PDCCH). In the illustrated example, the base station 402 transmits the downlink transmission 410 on a downlink beam 412 used for transmitting a downlink transmission (e.g., the downlink transmission 410). The UE 404 may receive the downlink transmission 410 via a beam 414 used for receiving a downlink transmission from the base station 402 (e.g., the downlink transmission 410).

At 420, the UE 404 may determine to transmit an uplink transmission. For example, the UE 404 may determine to transmit an uplink control channel (e.g., PUCCH), an SRS, and/or a scheduling request (SR). In the illustrated example of FIG. 4, an uplink transmit beam for the uplink transmission is not configured by the base station 402. For example, to reduce signaling overhead, spatial relation information may be an optional parameter for PUCCH and/or SRS and, thus, may not be explicitly configured by the base station 402 for the UE 404 in, for example, RRC (e.g., via "PUCCH-config" and/or "SRS-config").

Accordingly, the techniques disclosed herein enable the UE to determine an uplink transmit beam for transmitting the uplink transmission without an explicit configuration for each uplink transmission. For example, at 430, the UE 404 determines a default uplink transmit beam for transmitting the uplink transmission. As described below, the UE 404 may determine the default uplink transmit beam based on one or more parameters associated with a beam used for receiving a downlink transmission from the base station 402 (e.g., one or more parameters associated with the beam 414 used for receiving the downlink transmission 410).

At 440, the base station 402 selects a beam to monitor for receiving an uplink transmission. As described below, the base station 402 may select the beam to monitor for receiving the uplink transmission based on one or more parameters associated with the beam used for transmitting the downlink transmission to the UE 404 (e.g., one or more parameters associated with the beam 412 used for transmitting the downlink transmission 410).

After determining the default uplink transmit beam (e.g., at 430), the UE 404 transmits an uplink transmission 450 that is received by the base station 402. In the illustrated example, the UE 404 transmits the uplink transmission 450 on the determined default uplink transmit beam (e.g., a beam 452) used for transmitting an uplink transmission (e.g., the uplink transmission 450). The base station 402 may receive the uplink transmission 450 via a beam 454 used for receiving an uplink transmission from the UE 404 (e.g., the uplink transmission 450). In the illustrated example, the base station 402 may determine the beam 454 at 440.

While the example wireless communication 400 of FIG. 4 illustrates the UE 404 determining, at 430, the default uplink transmit beam and the base station 402 selecting, at 440, the beam to monitor at substantially the same time, the relative timing is illustrative. For example, in some examples, the base station 402 may perform the selecting of the beam to monitor (e.g., at 440) before the UE 404 performs the determining of the default uplink transmit beam (e.g., at 430), while in other examples, the base station 402 may perform the selecting of the beam to monitor (e.g., at 440) after the UE 404 performs the determining of the default uplink transmit beam (e.g., at 430).

In some examples, the UE 404 may be configured to operate using beam correspondence in which one or more parameters of the default uplink transmit beam may correspond to the beam used for receiving the downlink transmission. For example, when the UE 404 is operating using beam correspondence, one or more parameters of the default uplink transmit beam 452 may correspond to the beam 414 used for receiving the downlink transmission 410. By way of further example, the phase offsets and/or gains used by the UE 404 for antenna elements in an antenna array for transmitting the default uplink transmit beam may be the same or based on phase offsets and/or gains used to receive the downlink transmission.

In some examples, the downlink transmission 410 may be a downlink shared channel (e.g., PDSCH). In some such examples, the UE 404 may determine, at 430, the default uplink transmit beam 452 by selecting a beam corresponding to a transmission configuration indication (TCI) state identifier associated with the downlink shared channel. For example, the UE 404 may select the beam corresponding to the lowest TCI state identifier of activated TCI states associated with the downlink shared channel. In some examples, the UE 404 may select the beam corresponding to a particular TCI state identifier of TCI states associated with the downlink shared channel.

Similarly, in some examples, the base station 402 may select, at 440, the beam 454 to monitor for receiving the uplink transmission 450 based on a TCI state identifier associated with the downlink shared channel. For example, the base station 402 may select the beam corresponding to the lowest TCI state identifier of activated TCI states associated with the downlink shared channel. In some examples, the base station 402 may select the beam corresponding to a particular TCI state identifier of TCI states associated with the downlink shared channel.

In some examples, the UE 404 may select the beam corresponding to a last successfully received downlink shared channel beam after a threshold period. Similarly, in some examples, the base station 402 may select the beam corresponding to a last successfully received downlink shared channel beam after a threshold period. For example, when a downlink shared channel transmission is successfully received by the UE 404, the UE 404 may transmit an ACK signal to the base station 402 indicating that the downlink shared channel transmission was successfully received. As there may be a delay between the transmitting of the downlink shared channel transmission and the receiving of the ACK signal (e.g., the round trip time plus additional time for decoding, processing, etc. of transmissions/signals), the UE 404 may wait the threshold period after successfully receiving the downlink shared channel before selecting and/or transmitting using the beam corresponding to the received downlink shared beam. Similarly, the base station 402 may wait the threshold period before selecting and/or monitoring the beam corresponding to the successfully received downlink shared channel. The threshold period associated with the UE wait before selecting and/or transmitting may be the same or different than the threshold period associated with the base station wait before selecting and/or monitoring.

In some examples, the downlink transmission 410 may be a downlink control channel (e.g., PDCCH). In some examples, the UE 404 may determine, at 430, the default uplink transmit beam 452 by selecting a beam associated with a particular control resource set (CORESET), which includes a set of resources and/or parameters used to carry PDCCH and/or DCI. In some such examples, the particular CORESET may correspond to a CORESET with a lowest CORESET identifier in a slot last monitored by the UE 404. In some examples, the particular CORESET may correspond to a CORESET with a lowest CORESET identifier among a set of configured CORESETs. In some examples, the UE 404 may receive a CORESET identifier for the particular CORESET via RRC signaling and/or a medium access control-control element (MAC-CE).

Similarly, in some examples, the base station 402 may select, at 440, the beam 454 to monitor for receiving the uplink transmission 450 based on a beam associated with a particular CORESET. In such examples, the particular CORESET may correspond to a CORESET with a lowest CORESET identifier in a slot last monitored by the UE 404. In some examples, the particular CORESET may correspond to a CORESET with a lowest CORESET identifier among a set of configured CORESETs. In some examples, the base station 402 may transmit a CORESET identifier for the particular CORESET via RRC signaling and/or a MAC-CE.

While the illustrated example of FIG. 4 describes that the UE 404 may determine, at 430, the default uplink transmit beam 452 after receiving the downlink transmission 410, in some examples, the UE 404 may determine the default uplink transmit beam 452 before and/or without receiving the downlink transmission 410. For example, in some examples, a CORESET may be configured, and the UE 404 may determine, at 430, the default uplink transmit beam 452 based on a receive beam associated with the lowest CORESET ID. Accordingly, it should be appreciated that the downlink transmission providing the CORESET configuration may be the downlink transmission 410 and/or may be any other preceding downlink transmission from the base station 402 to the UE 404. Thus, it may be appreciated that in some examples, the UE 404 may first determine whether a CORESET is configured for UE 404 and may then determine the default uplink transmit beam 452 accordingly. For example, if the UE 404 determines that the CORESET is configured, then the UE 404 may select the beam associated with a particular CORESET. In some such examples, if the UE 404 determines that the CORESET is not configured, then the UE 404 may select the beam based on the PDSCH.

In some examples, the UE 404 may determine, at 430, the default uplink transmit beam 452 by selecting a beam indicated in DCI. Similarly, the base station 402 may select, at 440, the beam 454 to monitor for receiving the uplink transmission 450 based on the beam indicated in the DCI.

In some examples, the UE 404 may communicate with a plurality of transmit-receive points (TRPs). In some such examples, the UE 404 may determine, at 430, a default uplink transmit beam 452 for each of the TRPs based on the corresponding beams used for receiving the respective downlink transmissions. Similarly, the base station 402 may select, at 440, a beam to monitor for each of the TRPs based on the corresponding downlink beams (e.g., the beam 412 used to transmit the downlink transmission 410 to the UE 404).

While the illustrated example of FIG. 4 describes determining a default uplink transmit beam for transmitting an uplink transmission, in some examples, the UE 404 may determine the default uplink transmit beam based on the type of uplink transmission. For example, the UE 404 may determine a first default uplink transmit beam for transmitting an uplink control channel, a second default uplink transmit beam for transmitting an SRS, and a third default uplink transmit beam for transmitting an SR. In some examples, the first default uplink transmit beam, the second default uplink transmit beam, and/or the third default uplink transmit beam may be the same default uplink transmit beam. In other examples, at least one of the first default uplink transmit beam, the second default uplink transmit beam, and the third default uplink transmit beam may be different than another one of the default uplink transmit beams.

In some examples, the UE 404 may not be operating using beam correspondence. In some such examples, the UE 404 may receive, from the base station 402, default uplink spatial relation information for determining a default uplink transmit beam. In some examples, the UE 404 may receive, from the base station 402, the default uplink spatial relation information via RRC signaling, MAC-CE signaling, and/or DCI signaling. The UE 404 may then use the default uplink transmit beam for transmitting a plurality of subsequent uplink transmissions. In this manner, when the uplink transmit beam is not configured for an uplink transmission, the UE 404 may be able to determine a default uplink transmit beam for one or more uplink transmissions without receiving signaling for each of the respective uplink transmissions.

FIGS. 5 to 9 are flowcharts of methods of wireless communication, as disclosed herein. The methods may be performed by a UE (e.g., the UE 104, the UE 350, the UE 404, the UE 1350; the apparatus 1002/1002'; the processing system 1114, which may include the memory 360 and which may be the entire UE 350 or a component of the UE 350, such as the TX processor 368, the RX processor 356, and/or the controller/processor 359). Optional aspects are illustrated with a dashed line. The example flowcharts of FIGS. 5 to 9 facilitate a UE performing fast and efficient beam selection for transmitting an uplink transmission (e.g., when an uplink beam is not configured for the uplink transmission), which may result in reduced overhead signaling between the UE and the base station.

Figure 5:
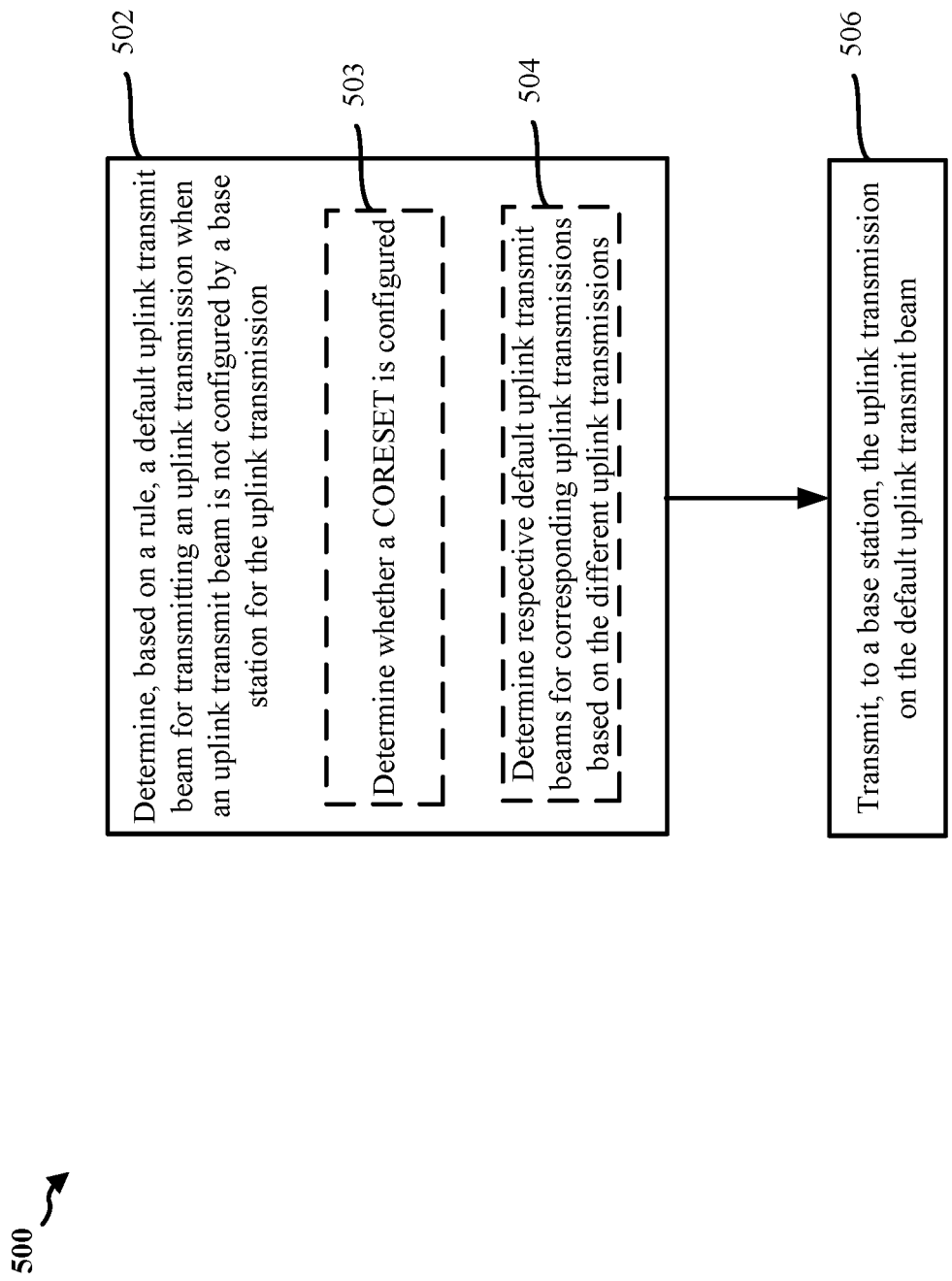
FIGS. 5 to 9 are flowcharts of methods of wireless communication at a UE, in accordance with the teachings disclosed herein.

FIG. 5 is a flowchart 500 of a method of wireless communication, as described in accordance with the teachings disclosed herein. At 502, the UE determines, based on a rule, a default uplink transmit beam for transmitting an uplink transmission when an uplink transmit beam is not configured by a base station for the uplink transmission, as described in connection with, for example, 430 of FIG. 4. For example, a default uplink transmit beam determination component 1018 may facilitate the determining of the default uplink transmit beam for transmitting the uplink transmission. For example, to reduce signaling overhead, spatial relation information for an uplink transmission (e.g., an uplink transmit beam) may be an optional parameter and, thus, may not be explicitly configured by the base station for the UE in, for example, RRC signaling. In the absence of an explicit configuration of the spatial relation information from the base station (e.g., the uplink transmit beam is not configured by the base station), the UE implicitly determines a default uplink transmit beam for transmitting an uplink transmission. In some examples, the UE may determine that the default uplink transmit beam corresponds to a beam used for receiving a downlink transmission, and where parameters for the default uplink transmit beam may correspond to the beam. In some examples, the UE may communicate with a plurality of TRPs. In some such examples, for each TRP, the UE may determine the default uplink transmit beam based on the corresponding beam used for receiving the downlink transmission.

In some examples, at 503, the UE may determine whether a CORESET is configured, as described in connection with 403 of FIG. 4. For example, the default uplink transmit beam determination component 1018 may facilitate the determining of whether a CORESET is configured. In some such examples, the UE may select the beam based on whether the CORESET is configured. For example, the UE may use a CORESET corresponding to a lowest CORESET identifier when a CORESET is configured and may use PDSCH when a CORESET is not configured.

In some examples, at 504, the UE may determine respective default uplink transmit beams for corresponding uplink transmissions based on the different uplink transmissions. For example, the default uplink transmit beam determination component 1018 may facilitate the determining of a first default uplink transmit beam for transmitting an uplink control channel, a second default uplink transmit beam for transmitting an SRS, and a third default uplink transmit beam for transmitting an SR. In some examples, one or more of the respective default uplink transmit beams may be the same default uplink transmit beam.

At 506, the UE transmits, to the base station, the uplink transmission on the default uplink transmit beam, as described in connection with, for example, the uplink transmission 450 of FIG. 4. For example, the transmission component 1006 may facilitate transmitting the uplink transmission on the default uplink transmit beam. In some examples, the uplink transmission includes at least one of an uplink control channel (e.g., PUCCH), an SRS, or an SR.

FIGS. 6 to 9 are flowcharts of methods of wireless communication. The example methods of FIGS. 6 to 9 may be used to determine the default uplink transmit beam. For example, the example methods of FIGS. 6 to 9 may facilitate implementing 502 of FIG. 5.

Figure 6:
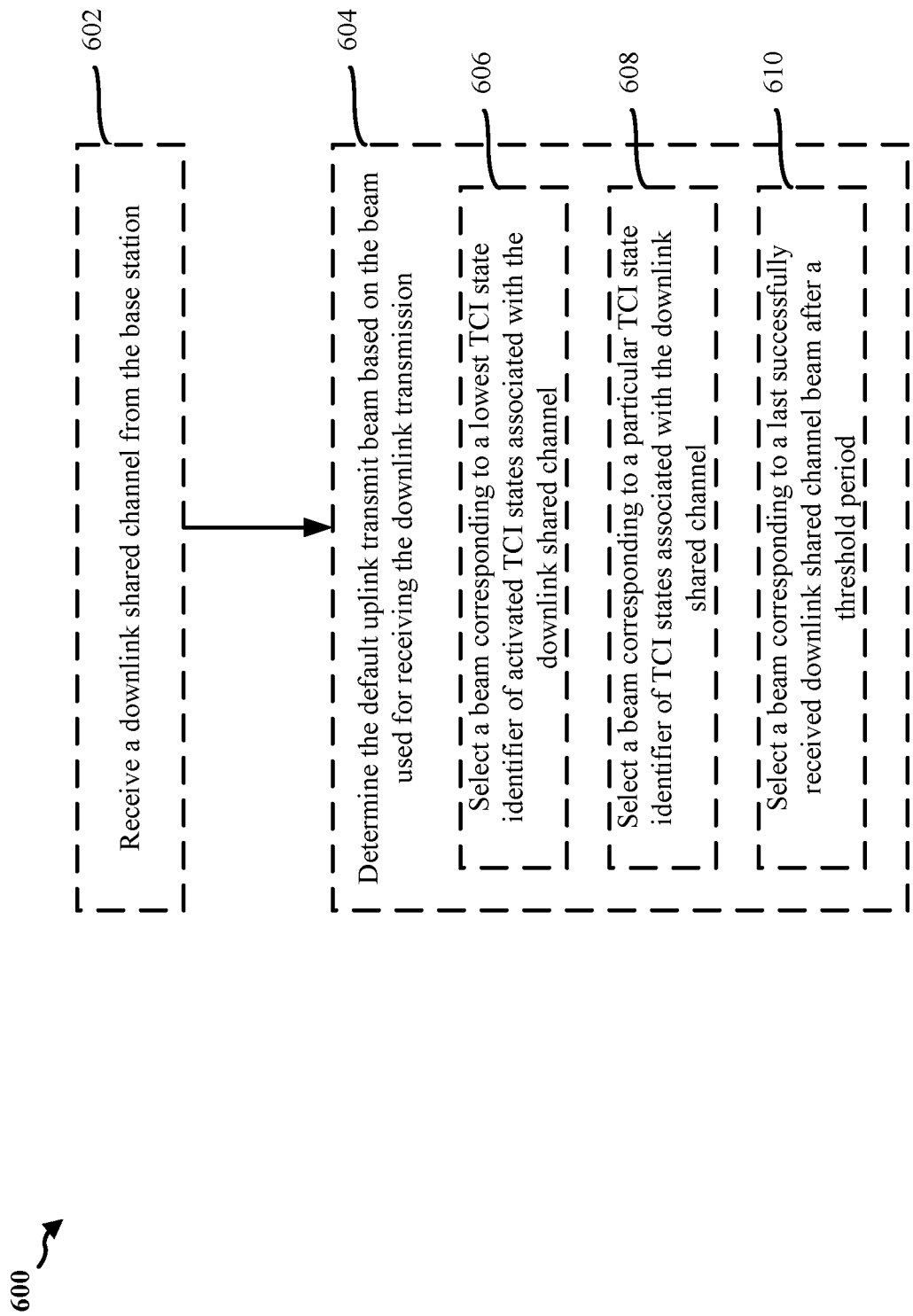

FIG. 6 is a flowchart 600 of a method of wireless communication, as described in accordance with the teachings disclosed herein. In the example of FIG. 6, the UE is operating using beam correspondence so that parameters for the default uplink transmit beam correspond to the beam used for receiving a downlink transmission.

At 602, the UE may receive a downlink shared channel from the base station, as described in connection with, for example, the downlink transmission 410 of FIG. 4. For example, the reception component 1004 may facilitate the receiving of the downlink shared channel.

At 604, the UE may determine the default uplink transmit beam based on the beam used for receiving the downlink transmission (e.g., the downlink shared channel), as described in connection with, for example, 430 of FIG. 4.

For example, a TCI state identifier component 1008 and/or a shared channel beam component 1010 may facilitate the determining of the default uplink transmit beam based on the beam used for receiving the downlink transmission.

In some examples, at 606, the UE may select a beam corresponding to a lowest TCI state identifier of activated TCI states associated with the downlink shared channel. For example, the TCI state identifier component 1008 may facilitate the selecting of the beam corresponding to the lowest TCI state identifier of activated TCI states associated with the downlink shared channel.

In some examples, at 608, the UE may select a beam corresponding to a particular TCI state identifier of TCI states associated with the downlink shared channel. For example, the TCI state identifier component 1008 may facilitate the selecting of the beam corresponding to the particular TCI state identifier of TCI states associated with the downlink shared channel.

In some examples, at 610, the UE may select a beam corresponding to a last successfully received downlink shared channel beam after a threshold period. For example, the shared channel beam component 1010 may facilitate the selecting of the beam corresponding to the last successfully received downlink shared channel beam after the threshold period.

Figure 7:
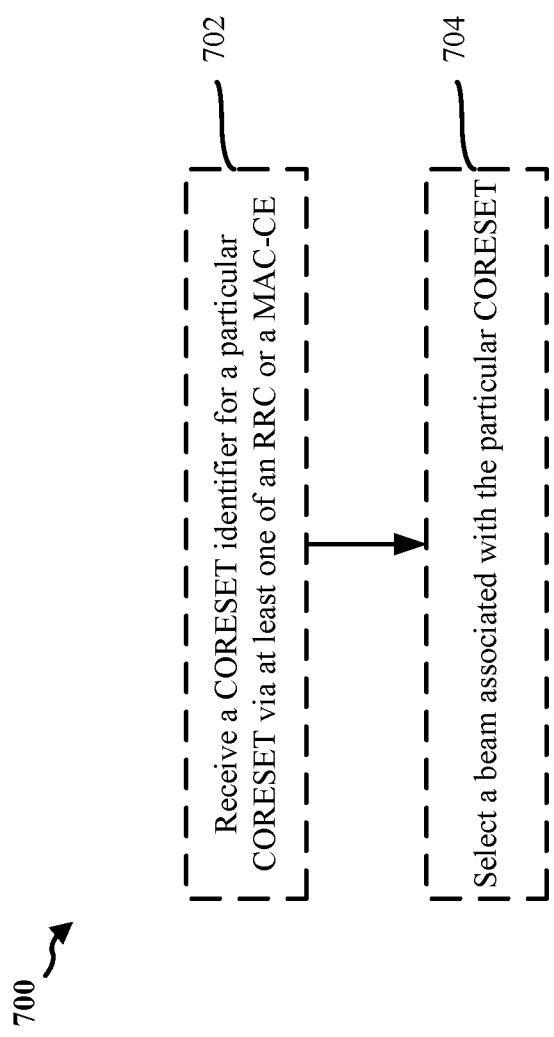

FIG. 7 is a flowchart 700 of a method of wireless communication, as described in accordance with the teachings disclosed herein. In the example of FIG. 7, the UE is operating using beam correspondence so that parameters for the default uplink transmit beam correspond to the beam used for receiving a downlink transmission.

At 702, the UE may receive a CORESET identifier for a particular CORESET via at least one of an RRC or a MAC-CE, as described in connection with the downlink transmission 410 of FIG. 4. For example, the reception component 1004 may facilitate the receiving of the CORESET identifier for the particular CORESET.

At 704, the UE may select a beam associated with the particular CORESET, as described in connection with, for example, 430 of FIG. 4. For example, a CORESET handling component 1012 may facilitate the selecting of the beam associated with the particular CORESET. In some examples, the particular CORESET may correspond to a CORESET having a lowest CORESET identifier in a slot last monitored by the UE. In some examples, the particular CORESET may correspond to a CORESET having a lowest CORESET identifier among a set of configured CORESETs.

Figure 8:
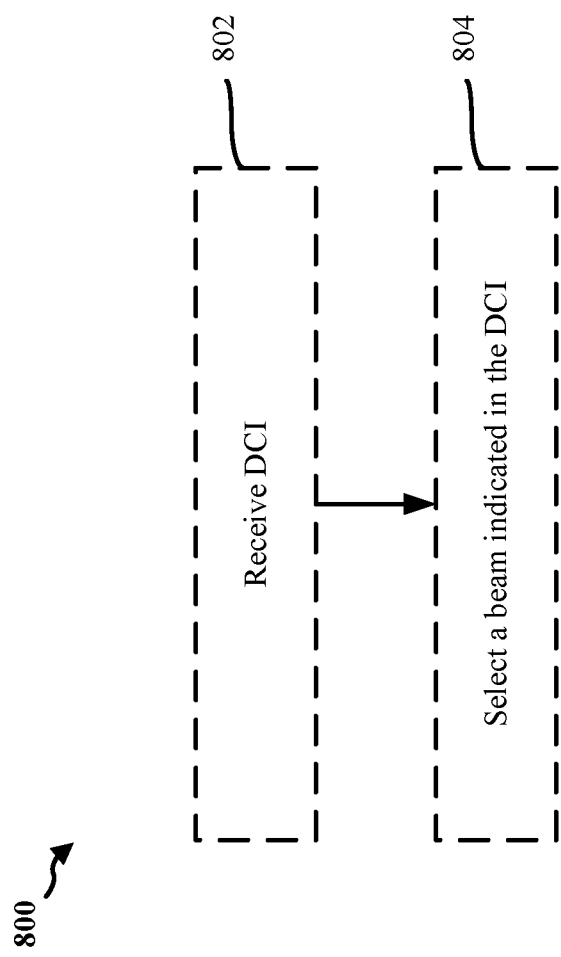

FIG. 8 is a flowchart 800 of a method of wireless communication, as described in accordance with the teachings disclosed herein. In the example of FIG. 8, the UE is operating using beam correspondence so that parameters for the default uplink transmit beam correspond to the beam used for receiving a downlink transmission.

At 802, the UE may receive DCI from the base station, as described in connection with, for example, the downlink transmission 410 of FIG. 4. For example, the reception component 1004 may facilitate the receiving of the DCI from the base station.

At 804, the UE may select a beam indicated in the DCI, as described in connection with, for example, 430 of FIG. 4. For example, a DCI handling component 1014 may facilitate the selecting of the beam indicated in the DCI. In some examples, the DCI may carry TCI state information (e.g., when a DCI is scheduling a PDSCH and carries the corresponding TCI state information). In some such examples, when the TCI state information is available to the UE, the UE may determine which receive beam to use for receiving the downlink transmission on that beam, which may be QCL with the TCI state information. For example, in a CORESET, there may be an option to enable or disable a "tci-PresentInDCI" parameter in the RRC, which indicates whether the DCI carries TCI state information of a scheduled shared channel. In some examples, the TCI states may be associated with one or more DL reference signals and a corresponding QCL (quasi co-location) type. For example, QCL-type D may relate to receive beam parameters. In such examples, the UE may select a beam based on the receive beam parameters used for receiving downlink beams configured by DCI.

Figure 9:
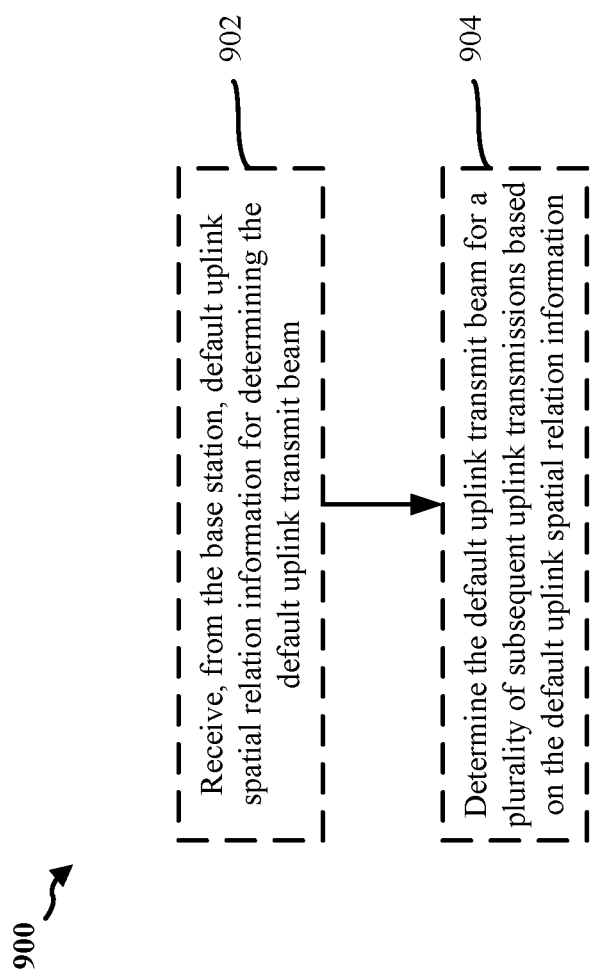

FIG. 9 is a flowchart 900 of a method of wireless communication, as described in accordance with the teachings disclosed herein. At 902, the UE may receive, from the base station, default uplink spatial relation information for determining the default uplink transmit beam for transmitting an uplink transmission when an uplink transmit beam for the uplink transmission is not configured, as described in connection with, for example, the downlink transmission 410 of FIG. 4. For example, the reception component 1004 may facilitate the receiving of the default uplink spatial relation information. In some examples, the UE may receive the default uplink spatial relation information via at least one of RRC signaling, MAC-CE signaling, and/or DCI signaling.

At 904, the UE may determine the default uplink transmit beam for a plurality of subsequent uplink transmissions based on the default uplink spatial relation information, as described in connection with, for example, 430 of FIG. 4. For example, the spatial relation information handling component 1016 may facilitate the determining of the default uplink transmit beam based on the default uplink spatial relation information.

Figure 10:
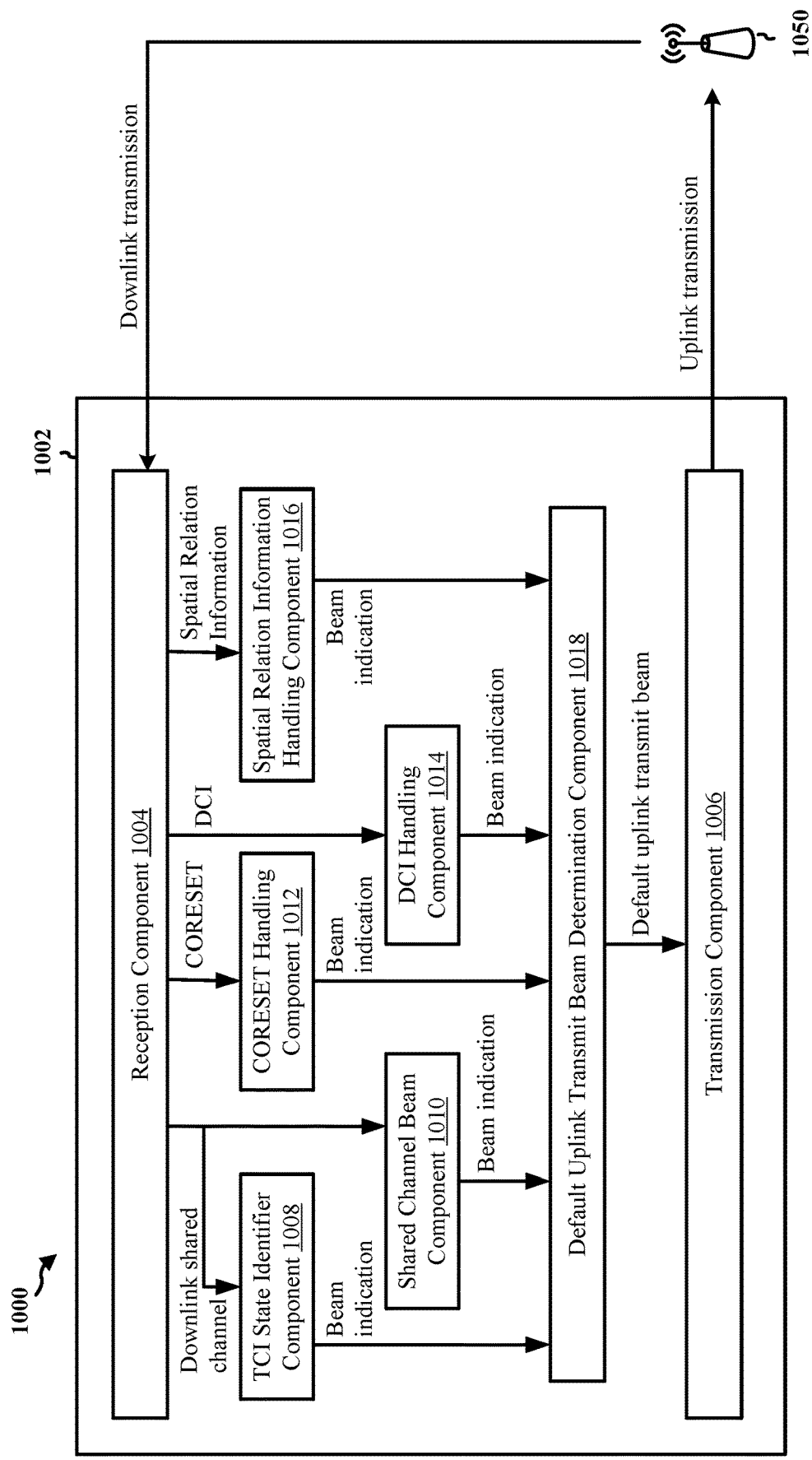
FIG. 10 is a conceptual data flow diagram illustrating the data flow between different means/components in an example apparatus.

FIG. 10 is a conceptual data flow diagram 1000 illustrating the data flow between different means/components in an example apparatus 1002 in communication with a base station 1050. The apparatus 1002 may be a UE or a component of a UE. The apparatus 1002 includes a reception component 1004, a transmission component 1006, a TCI state identifier component 1008, a shared channel beam component 1010, a CORESET handling component 1012, a DCI handling component 1014, a spatial relation information handling component 1016, and a default uplink transmit beam determination component 1018. The base station 1050 may include the same or similar component as shown with respect to the base station 102/180 of FIG. 1, the base station 310 of FIG. 3, the base station 402 of FIG. 4, and/or the apparatus 1302/1302' of FIGS. 13/14.

The reception component 1004 may be configured to receive various types of signals/messages and/or other information from other devices, including, for example, the base station 1050. The messages/information may be received via the reception component 1004 and provided to one or more component of the apparatus 1002 for further processing and/or use in performing various operations. For example, the reception component 1004 may be configured to receive downlink transmissions including, for example, a downlink shared channel, a CORESET, DCI signaling, default spatial relation information, MAC-CE signaling, and/or RRC signaling (e.g., as described in connection with 602, 702, 802, and/or 902).

The transmission component 1006 may be configured to transmit various types of signals/messages and/or other information to other devices, including, for example, the base station 1050. For example, the transmission component

1006 may be configured to transmit an uplink transmission on a default uplink transmit beam (e.g., as described in connection with 506).

The TCI state identifier component 1008 may be configured to select a beam corresponding to a lowest TCI state identifier of activated TCI states associated with a downlink shared channel and/or select a beam corresponding to a particular TCI state identifier of TCI states associated with the downlink shared channel (e.g., as described in connection with 604, 606, and/or 608).

The shared channel beam component 1010 may be configured to select a beam corresponding to a last successfully received downlink shared channel beam after a threshold period (e.g., as described in connection with 604 and/or 610).

The CORESET handling component 1012 may be configured to select a beam associated with a particular CORESET (e.g., as described in connection with 704). In some examples, the particular CORESET includes a lowest CORESET identifier in a slot last monitored by the UE. In some examples, the particular CORESET includes a lowest CORESET identifier among a set of configured CORESETs.

The DCI handling component 1014 may be configured to select a beam indicated in DCI (e.g., as described in connection with 804).

The spatial relation information handling component 1016 may be configured to determine the default uplink transmit beam for a plurality of subsequent uplink transmissions based on the default uplink spatial relation information (e.g., as described in connection with 904).

The default uplink transmit beam determination component 1018 may be configured to determine, based on a rule, a default uplink transmit beam for transmitting an uplink transmission when an uplink transmit beam is not configured by a base station for the uplink transmission (e.g., as described in connection with 502 and/or 504). For example, the default uplink transmit beam determination component 1018 may use the beam indication provided by the TCI state identifier component 1008, the shared channel beam component 1010, the CORESET handling component 1012, the DCI handling component 1014, and/or the spatial relation information handling component 1016 to determine the default uplink transmit beam. In some examples, the default uplink transmit beam determination component 1018 may determine a respective default uplink transmit beam for a corresponding uplink transmission type (e.g., an SRS, an uplink control channel, and/or an SR (e.g., as described in connection with 504).

The apparatus may include additional components that perform each of the blocks of the algorithm in the aforementioned flowcharts of FIGS. 5 to 9. As such, each block in the aforementioned flowcharts of FIGS. 5 to 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
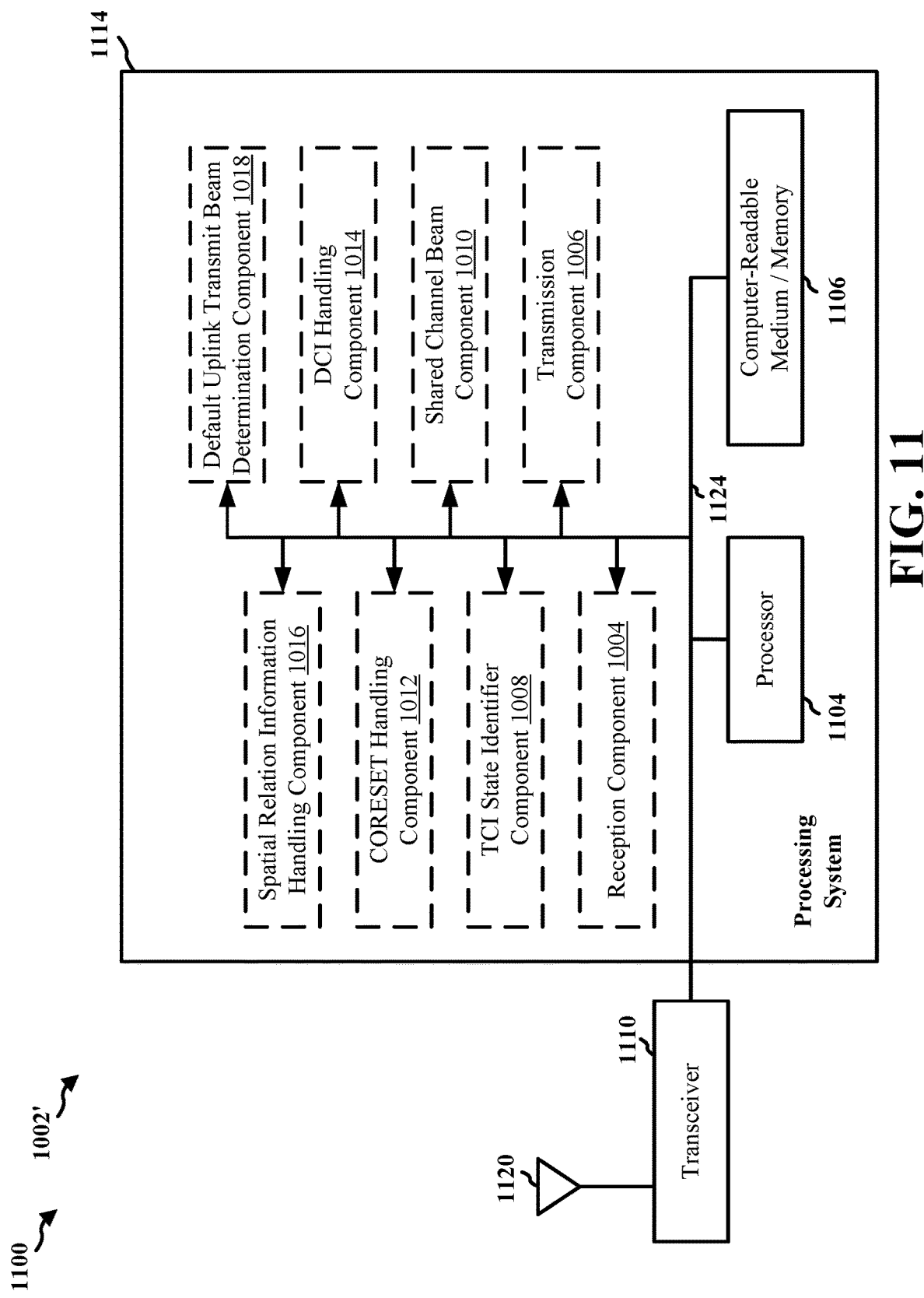
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359. Alternatively, the processing system 1114 may be the entire UE (e.g., see the UE 350 of FIG. 3).

In one configuration, the apparatus 1002/1002' for wireless communication includes means for determining, based on a rule, a default uplink transmit beam for transmitting an uplink transmission when an uplink transmit beam is not configured by a base station for the uplink transmission, and means for transmitting, to the base station, the uplink transmission on the default uplink transmit beam. In another aspect, the apparatus 1002/1002' may include means for determining that the default uplink transmit beam corresponds to a beam used for receiving a downlink transmission, and that parameters for the default uplink transmit beam may correspond to the beam. In another aspect, the apparatus 1002/1002' may include means for receiving a downlink shared channel from the base station, and means for determining the default uplink transmit beam based on the rule may be configured to determine the default uplink transmit beam based on the beam used for receiving the downlink transmission. In another aspect, the apparatus 1002/1002' may include means for selecting a beam corresponding to a lowest TCI state identifier of activated TCI states associated with the downlink shared channel. In another aspect, the apparatus 1002/1002' may include means for selecting a beam corresponding to a TCI state identifier of TCI states associated with the downlink shared channel. In another aspect, the apparatus 1002/1002' may include means for selecting a beam corresponding to a last successfully received downlink shared channel beam after a threshold period. In another aspect, the apparatus 1002/1002' may include means for selecting a beam associated with a CORESET. In another aspect, the apparatus 1002/1002' may include means for receiving a CORESET identifier for the CORESET via at least one of RRC signaling or a MAC-CE. In another aspect, the apparatus 1002/1002' may include means for selecting a beam indicated in DCI. In another aspect, the apparatus 1002/1002' may include means for determining the default uplink transmit beam for each TRP of a plurality of TRP based on the corresponding beam used for receiving downlink transmissions. In another aspect, the apparatus 1002/1002' may include means for determining a first default uplink transmit beam for transmitting an uplink control channel, means for determining a second default uplink transmit beam for transmitting an SRS, and/or means for determining a third default uplink transmit beam for transmitting an SR. In another aspect, the apparatus 1002/1002' may include means for receiving, from the base station, default uplink spatial relation information for determining the default uplink transmit beam, and means for determining the default uplink transmit beam for a plurality of subsequent uplink transmissions based on the default uplink spatial relation information. In another aspect, the apparatus 1002/1002' may include means for receiving the default uplink spatial relation information via at least one of RRC signaling, MAC-CE signaling, and DCI signaling.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
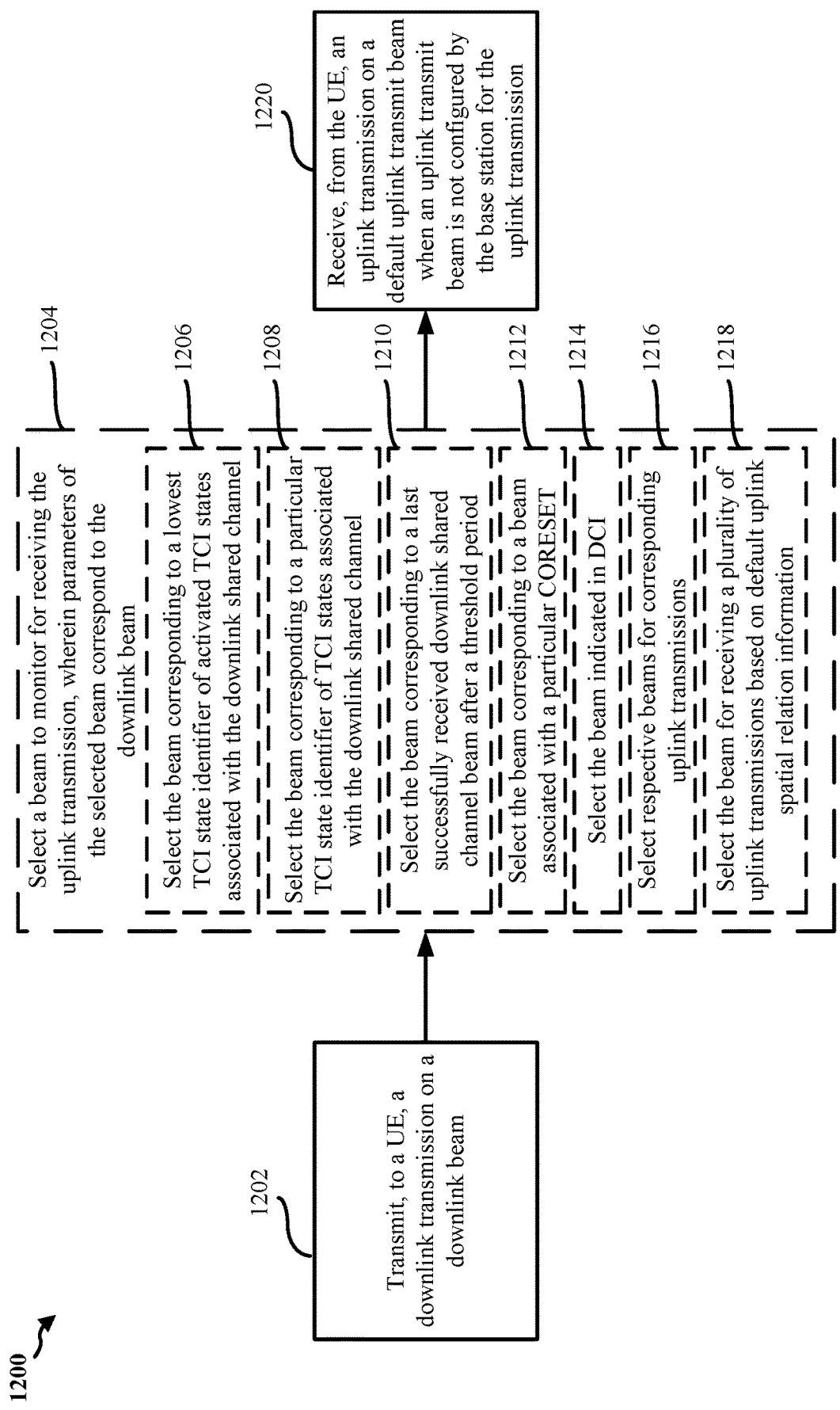
FIG. 12 is a flowchart of a method of wireless communication at a base station, in accordance with the teachings disclosed herein.

FIG. 12 is a flowchart 1200 of a method of wireless communication. The method may be performed by a base station (e.g., 102/180, the base station 310, the base station 402, the base station 1050, the apparatus 1302/1302', the processing system 1414, which may include the memory 376 and which may be the entire base station 310 or a component of the base station 310, such as the TX processor 316, the RX processor 370, and/or the controller/processor 375). Optional aspects are illustrated with a dashed line. The example flowchart 1200 of FIG. 12 facilitates a base station enabling fast and efficient uplink beam selection by a UE for transmitting an uplink transmission (e.g., when an uplink beam is not configured for the uplink transmission), which may result in improved cell coverage by, for example, reducing overhead signaling between the base station and the UE.

At 1202, the base station transmits, to a UE, a downlink transmission on a downlink beam, as described in connection with, for example, the downlink transmission 410 of FIG. 4. For example, the transmission component 1306 may facilitate the transmitting of the downlink transmission. In some examples, the downlink transmission may comprise one or more of a downlink shared channel, a CORESET, DCI signaling, and/or default spatial relation information. In some examples, the downlink transmission may be transmitted via RRC signaling or MAC-CE signaling.

At 1204, the base station may select a beam to monitor for receiving the uplink transmission, as described in connection with, for example, 440 of FIG. 4. For example, a beam selection component 1308 may facilitate the selecting of the beam to monitor for receiving the uplink transmission. In some examples, parameters of the selected beam may correspond to the downlink beam.

In some examples, the downlink transmission may be a downlink shared channel and the base station may select the beam based on parameters associated with the downlink shared channel. For example, at 1206, the base station may select the beam corresponding to a lowest TCI state identifier of activated TCI states associated with the downlink shared channel. For example, a downlink shared channel handling component 1310 may facilitate the selecting of the beam corresponding to the lowest TCI state identifier of activated TCI states associated with the downlink shared channel.

In some examples, at 1208, the base station may select the beam corresponding to a particular TCI state identifier of TCI states associated with the downlink shared channel. For example, the downlink shared channel handling component 1310 may facilitate the selecting of the beam corresponding to the particular TCI state identifier of TCI states associated with the downlink shared channel.

In some examples, at 1210, the base station may select the beam corresponding to a last successfully received downlink shared channel beam after a threshold period. For example, the downlink shared channel handling component 1310 may facilitate the selecting of the beam corresponding to the last successfully received downlink shared channel beam after a threshold period.

In some examples, the downlink transmission may include a CORESET identifier associated with a particular CORESET and the base station may select the beam based on the particular CORESET. For example, at 1212, the base station may select the beam corresponding to a beam associated with a particular CORESET. For example, a CORESET handling component 1312 may facilitate the selecting of the beam corresponding to the beam associated with the particular CORESET. In some examples, the particular CORESET includes a lowest CORESET identifier in a slot last monitored by the UE. In some examples, the particular CORESET includes a lowest CORESET identifier among a set of configured CORESETs. In some examples, the base station may transmit the CORESET identifier via at least one of RRC signaling or MAC-CE signaling.

In some examples, the downlink transmission may include DCI signaling and the base station may select the beam based on the DCI signaling. For example, at 1214, the base station may select the beam indicated in the DCI signaling. For example, a DCI handling component 1314 may facilitate the selecting of the beam based on the DCI signaling.

In some examples, at 1216, the base station may select respective beams for corresponding uplink transmissions. For example, the beam selection component 1308 may facilitate the selecting of a first beam for receiving an uplink control channel, a second beam for receiving an SRS, and a third beam for receiving an SR. In some example, two or more of the beams may be the same beam.

In some examples, the downlink transmission may comprise default uplink spatial relation information, and the base station may select the beam to monitor based on the default uplink spatial relation information. For example, at 1218, the base station may select the beam for receiving a plurality of uplink transmissions based on the default uplink spatial relation information. For example, a spatial relation information handling component 1316 may facilitate the selecting of the beam based on the default uplink spatial relation information.

At 1220, the base statin receives, from the UE, an uplink transmission on a default uplink transmit beam when an uplink transmit beam is not configured by the base station for the uplink transmission, as described in connection with, for example, the uplink transmission 450 and the beam 454 of FIG. 4. For example, a reception component 1304 may receive the uplink transmission. As described above, to reduce signaling overhead, spatial relation information for an uplink transmission (e.g., an uplink transmit beam) may be an optional parameter and, thus, may not be explicitly configured by the base station for the UE. In the absence of an explicit configuration of the spatial relation information from the base station (e.g., the uplink transmit beam is not configured by the base station), the UE may implicitly determine a default uplink transmit beam for transmitting an uplink transmission.

Figure 13:
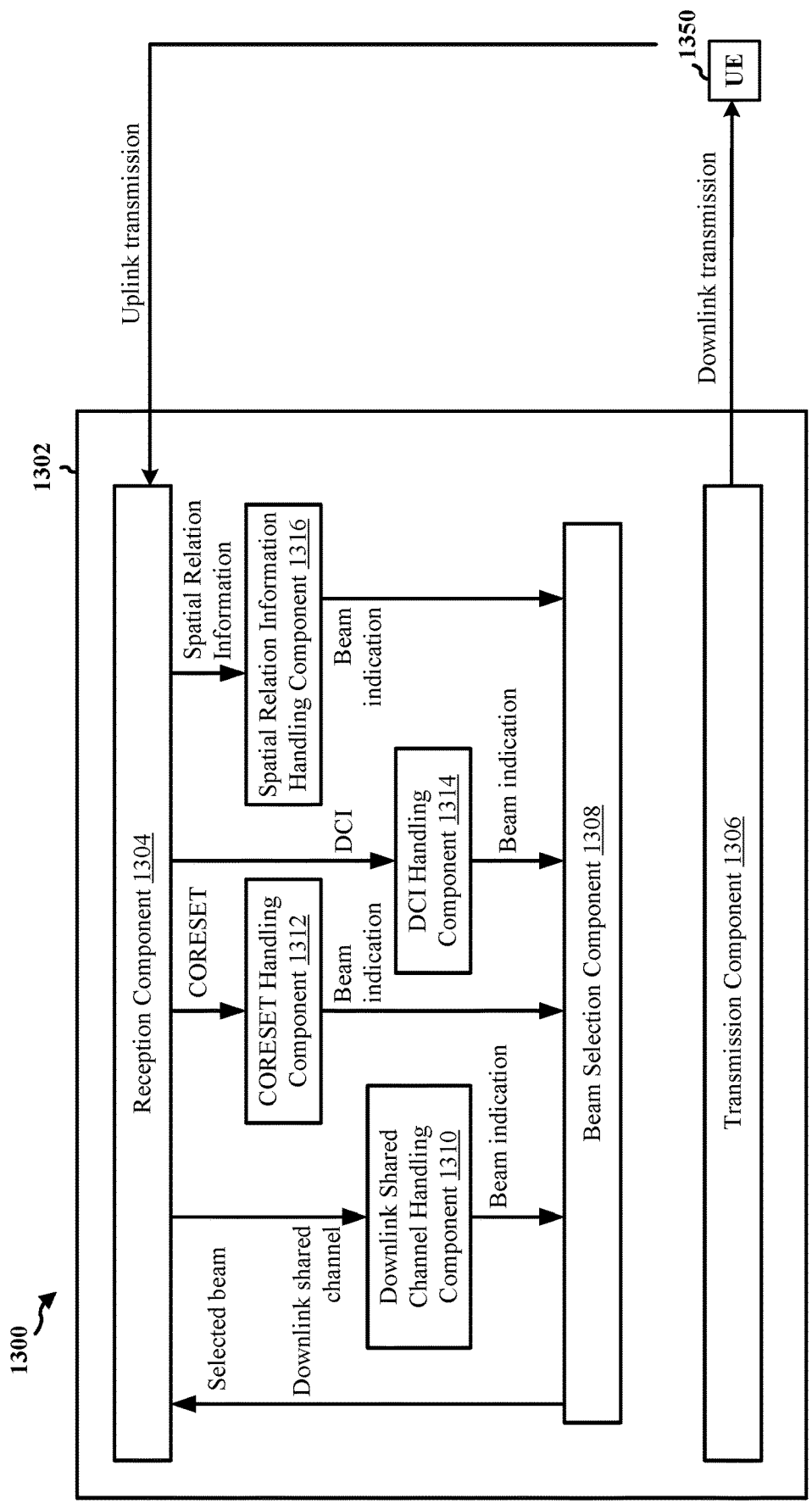
FIG. 13 is a conceptual data flow diagram illustrating the data flow between different means/components in an example apparatus.

FIG. 13 is a conceptual data flow diagram 1300 illustrating the data flow between different means/components in an example apparatus 1302 in communication with a UE 1350. The apparatus 1302 may be a base station or a component of a base station. The apparatus 1302 includes a reception component 1304, a transmission component 1306, a beam selection component 1308, a downlink shared channel handling component 1310, a CORESET handling component 1312, a DCI handling component 1314, and a spatial relation information handling component 1316. The UE 1350 may include the same or similar component as shown with respect to the UE 104 of FIG. 1, the UE 350 of FIG. 3, the UE 404 of FIG. 4, and/or the apparatus 1002/1002' of FIGS. 10/11.

The reception component 1304 may be configured to receive various types of signals/messages and/or other information from other devices, including, for example, the UE 1350. The messages/information may be received via the reception component 1304 and provided to one or more components of the apparatus 1302 for further processing and/or use in performing various operations. For example, the reception component 1304 may be configured to receive an uplink transmission transmitted on a default uplink transmit beam when an uplink transmit beam is not configured by the station for the uplink transmission (e.g., as described in connection with 1220).

The transmission component 1306 may be configured to transmit various types of signals/messages and/or other information to other devices, including, for example, the UE 1350. For example, the transmission component 1306 may be configured to transmit a downlink transmission on a downlink beam used for transmitting the downlink transmission, transmit a downlink shared channel, transmit a CORESET identifier via RRC signaling or MAC-CE signaling, transmit DCI signaling, and/or transmit default uplink spatial relation information via RRC signaling, MAC-CE signaling or DCI signaling (e.g., as described in connection with 1202).

The beam selection component 1308 may be configured to select a beam to monitor for receiving the uplink transmission and/or to select respective beams for corresponding uplink transmissions (e.g., as described in connection with 1204 and/or 1216).

The downlink shared channel handling component 1310 may be configured to select the beam corresponding to a lowest TCI state identifier of activated TCI states associated with the downlink shared channel, to select the beam corresponding to a particular TCI state identifier of TCI states associated with the downlink shared channel, and/or to select the beam corresponding to a last successfully received downlink shared channel beam after a threshold period (e.g., as described in connection with 1206, 1208, and/or 1210).

The CORESET handling component 1312 may be configured to select the beam corresponding to a beam associated with a particular CORESET (e.g., as described in connection with 1212).

The DCI handling component 1314 may be configured to select the beam indicated in the DCI signaling (e.g., as described in connection with 1214).

The spatial relation information handling component 1316 may be configured to select the beam for receiving a plurality of uplink transmissions based on the default uplink spatial relation information (e.g., as described in connection with 1218).

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
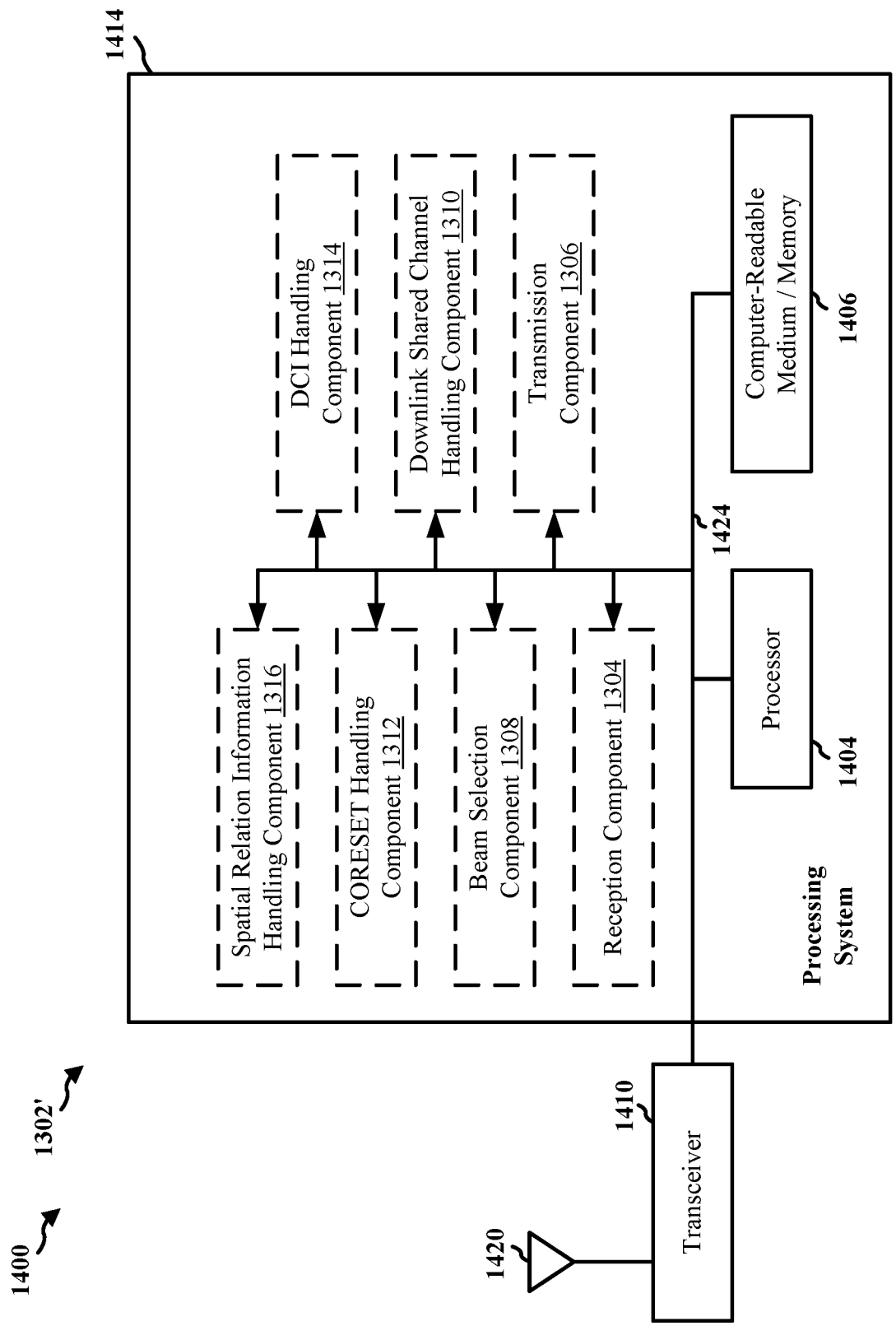
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, 1316, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312,

1314, 1316. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375. Alternatively, the processing system 1414 may be the entire base station (e.g., see the base station 310 of FIG. 3).

In one configuration, the apparatus 1302/1302' for wireless communication includes means for transmitting, to a UE, a downlink transmission on a downlink beam used for transmitting the downlink transmission, and means for receiving, from the UE, an uplink transmission on a default uplink transmit beam when an uplink transmit beam is not configured by the base station for the uplink transmission. In another aspect, the apparatus 1302/1302' may include means for selecting a beam to monitor for receiving the uplink transmission, and where parameters of the selected beam correspond to the downlink beam. In another aspect, the apparatus 1302/1302' may include means for selecting the beam corresponding to a lowest TCI state identifier of activated TCI states associated with the downlink shared channel. In another aspect, the apparatus 1302/1302' may include means for selecting the beam corresponding to a TCI state identifier of TCI states associated with the downlink shared channel. In another aspect, the apparatus 1302/1302' may include means for selecting the beam corresponding to a last successfully received downlink shared channel beam after a threshold period. In another aspect, the apparatus 1302/1302' may include means for selecting the beam to monitor for receiving the uplink transmission based on a beam associated with a CORESET. In another aspect, the apparatus 1302/1302' may include means for transmitting a CORESET identifier for the CORESET via at least one of an RRC or a MAC-CE. In another aspect, the apparatus 1302/1302' may include means for selecting the beam to monitor for receiving the uplink transmission based on a beam indicated in DCI. In another aspect, the apparatus 1302/1302' may include means for communicating using a plurality of TRPs, and where, for each TRP, the selecting of the beam to monitor for receiving the uplink transmission is based on the corresponding downlink beam. In another aspect, the apparatus 1302/1302' may include means for selecting a first beam for receiving an uplink control channel, and means for selecting a second beam for receiving an SRS. In another aspect, the apparatus 1302/1302' may include means for selecting a beam to monitor for receiving a plurality of uplink transmissions based on default uplink spatial relation information. In another aspect, the apparatus 1302/1302' may include means for transmitting the default uplink spatial relation information to the UE via at least one of RRC signaling, MAC-CE signaling, and DCI signaling.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method of wireless communication at a UE, comprising: determining, based on a rule, a default uplink transmit beam for transmitting an uplink transmission when an uplink transmit beam is not configured by a base station for the uplink transmission; and transmitting, to the base station, the uplink transmission on the default uplink transmit beam.

In Example, 2, the method of Example 1 further includes that the UE determines that the default uplink transmit beam corresponds to a beam used for receiving a downlink transmission, wherein parameters for the default uplink transmit beam correspond to the beam.

In Example 3, the method of any of Example 1 or Example 2 further includes: receiving a downlink shared channel from the base station, and wherein the determining of the default uplink transmit beam based on the rule includes determining the default uplink transmit beam based on the beam used for receiving the downlink transmission.

In Example 4, the method of any of Example 1 to Example 3 further includes that the determining of the default uplink transmit beam based on the beam used for receiving the downlink transmission includes selecting a beam corresponding to a lowest TCI state identifier of activated TCI states associated with the downlink shared channel.

In Example 5, the method of any of Example 1 to Example 4 further includes that the determining of the default uplink transmit beam based on the beam used for receiving the downlink transmission includes selecting a beam corresponding to a TCI state identifier of TCI states associated with the downlink shared channel.

In Example 6, the method of any of Example 1 to Example 5 further includes that the determining of the default uplink transmit beam based on the beam used for receiving the downlink transmission includes selecting a beam corresponding to a last successfully received downlink shared channel beam after a threshold period.

In Example 7, the method of any of Example 1 to Example 6 further includes that the determining of the default uplink transmit beam based on the rule includes selecting a beam associated with a control resource set (CORESET) having a lowest CORESET identifier.

In Example 8, the method of any of Example 1 to Example 7 further includes that the CORESET includes a lowest CORESET identifier in a slot last monitored by the UE.

In Example 9, the method of any of Example 1 to Example 8 further includes that the CORESET includes a lowest CORESET identifier among a set of configured CORESETs.

In Example 10, the method of any of Example 1 to Example 9 further includes receiving, at the UE, a CORESET identifier for the CORESET via at least one of a RRC or a MAC-CE.

In Example 11, the method of any of Example 1 to Example 10 further includes that the determining of the default uplink transmit beam based on the rule includes selecting a beam indicated in DCI.

In Example 12, the method of any of Example 1 to Example 11 further includes that the UE communicates with a plurality of TRPs, and wherein for each TRP, the determining of the default uplink transmit beam is based on the corresponding beam used for receiving downlink transmissions.

In Example 13, the method of any of Example 1 to Example 12 further includes that the uplink transmission comprises at least one of an uplink control channel, an SRS, or an SR.

In Example 14, the method of any of Example 1 to Example 13 further includes that the determining of the default uplink transmit beam for transmitting the uplink transmission comprises determining a first default uplink transmit beam for transmitting an uplink control channel, the Example further comprising: determining a second default uplink transmit beam for transmitting an SRS.

In Example 15, the method of any of Example 1 to Example 14 further includes that the first default uplink transmit beam is the same as the second default uplink transmit beam.

In Example 16, the method of any of Example 1 to Example 15 further includes: receiving, from the base station, default uplink spatial relation information for determining the default uplink transmit beam; and determining the default uplink transmit beam for a plurality of subsequent uplink transmissions based on the default uplink spatial relation information.

In Example 17, the method of any of Example 1 to Example 16 further includes receiving the default uplink spatial relation information via at least one of RRC signaling, MAC-CE signaling, and DCI signaling.

Example 18 is a system or apparatus including means for implementing a method or realizing an apparatus as in any of Examples 1 to 17.

Example 19 is a device including one or more processors and one or more memories in electronic communication with the one or more processors storing instructions executable by the one or more processors to cause a system or an apparatus to implement a method as in any of Examples 1 to 17.

Example 20 is a non-transitory computer-readable medium storing instructions executable by one or more processors to cause the one or more processors to implement a method as in any of Examples 1 to 17.

Example 21 is a method of wireless communication at a base station, comprising: transmitting, to a UE, a downlink transmission on a downlink beam; and receiving, from the UE, an uplink transmission using a default uplink transmit beam when an uplink transmit beam is not configured by the base station for the uplink transmission.

In Example 22, the method of Example 21 further includes selecting a beam to monitor for receiving the uplink transmission, wherein parameters of the selected beam correspond to the downlink beam.

In Example 23, the method of any of Example 21 or Example 22 further includes that the downlink transmission is a downlink shared channel, and the selected beam corresponds to a lowest TCI state identifier of activated TCI states associated with the downlink shared channel.

In Example 24, the method of any of Example 21 to Example 23 further includes that the downlink transmission is a downlink shared channel, and the selected beam corresponds to a TCI state identifier of TCI states associated with the downlink shared channel.

In Example 25, the method of any of Example 21 to Example 24 further includes that the downlink transmission is a downlink shared channel, and the selected beam corresponds to a last successfully received downlink shared channel beam after a threshold period.

In Example 26, the method of any of Example 21 to Example 25 further includes that the selecting of the beam to monitor for receiving the uplink transmission is based on a beam associated with a control resource set (CORESET) having a lowest CORESET identifier.

In Example 27, the method of any of Example 21 to Example 26 further includes that the CORESET includes a lowest CORESET identifier in a slot last monitored by the UE.

In Example 28, the method of any of Example 21 to Example 27 further includes that the CORESET includes a lowest CORESET identifier among a set of configured CORESETS.

In Example 29, the method of any of Example 21 to Example 28 further includes transmitting a CORESET identifier for the CORESET via at least one of a RRC or a MAC-CE.

In Example 30, the method of any of Example 21 to Example 29 further includes that the selecting of the beam to monitor for receiving the uplink transmission is based on a beam indicated in DCI.

In Example 31, the method of any of Example 21 to Example 30 further includes that the base station communicates using a plurality of TRPs, and wherein for each TRP, the selecting of the beam to monitor for receiving the uplink transmission is based on the corresponding downlink beam.

In Example 32, the method of any of Example 21 to Example 31 further includes that the uplink transmission comprises at least one of an uplink control channel, an SRS, or an SR.

In Example 33, the method of any of Example 21 to Example 32 further includes that the selecting of the beam to monitor for receiving the uplink transmission includes selecting a first beam for receiving an uplink control channel, the Example further comprising: selecting a second beam for receiving an SRS.

In Example 34, the method of any of Example 21 to Example 33 further includes that the first beam is the same as the second beam.

In Example 35, the method of any of Example 21 to Example 34 further includes that the downlink transmission includes default uplink spatial relation information for determining the default uplink transmit beam, the Example further comprising: selecting a beam to monitor for receiving a plurality of uplink transmissions based on the default uplink spatial relation information.

In Example 36, the method of any of Example 21 to Example 35 further includes transmitting the default uplink spatial relation information to the UE via at least one of RRC signaling, MAC-CE signaling, and DCI signaling.

Example 37 is a system or apparatus including means for implementing a method or realizing an apparatus as in any of Examples 21 to 36.

Example 38 is a device including one or more processors and one or more memories in electronic communication with the one or more processors storing instructions executable by the one or more processors to cause a system or an apparatus to implement a method as in any of Examples 21 to 36.

Example 39 is a non-transitory computer-readable medium storing instructions executable by one or more processors to cause the one or more processors to implement a method as in any of Examples 21 to 36.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    determining, based on a rule, a default uplink transmit beam for transmitting an uplink transmission when an uplink transmit beam is not configured by a base station for the uplink transmission, wherein the default uplink transmit beam corresponds to a beam used for receiving a downlink transmission, wherein parameters for the default uplink transmit beam correspond to the beam, and wherein the determining of the default uplink transmit beam includes selecting a beam associated with a control resource set (CORESET) having a lowest CORESET identifier; and
    transmitting, to the base station, the uplink transmission on the default uplink transmit beam.

2. The method of claim 1, wherein the uplink transmission comprises at least one of an uplink control channel, a sounding reference signal (SRS), or a scheduling request (SR).

3. The method of claim 2, wherein the determining of the default uplink transmit beam for transmitting the uplink transmission comprises determining a first default uplink transmit beam for transmitting the uplink control channel, the method further comprising:
    determining a second default uplink transmit beam for transmitting the SRS.

4. The method of claim 1, wherein the CORESET includes the lowest CORESET identifier in a slot last monitored by the UE.

5. The method of claim 1, wherein the CORESET includes the lowest CORESET identifier among a set of configured CORESETs.

6. The method of claim 1, further comprising:
    receiving a downlink shared channel from the base station, and
    wherein the determining of the default uplink transmit beam based on the rule further includes determining the default uplink transmit beam based on the beam used for receiving the downlink transmission.

7. The method of claim 6, wherein the determining of the default uplink transmit beam based on the beam used for receiving the downlink transmission includes selecting the beam corresponding to a lowest transmission configuration indication (TCI) state identifier of activated TCI states associated with the downlink shared channel.

8. The method of claim 6, wherein the determining of the default uplink transmit beam based on the beam used for receiving the downlink transmission includes selecting the beam corresponding to a transmission configuration indication (TCI) state identifier of TCI states associated with the downlink shared channel.

9. The method of claim 6, wherein the determining of the default uplink transmit beam based on the beam used for receiving the downlink transmission includes selecting the beam corresponding to a last successfully received downlink shared channel beam after a threshold period.

10. The method of claim 1, wherein the determining of the default uplink transmit beam based on the rule further includes selecting the beam indicated in downlink control information (DCI).

11. The method of claim 1, wherein the UE communicates with a plurality of transmit-receive points (TRPs), and wherein for each TRP, the determining of the default uplink transmit beam is based on the corresponding beam used for receiving downlink transmissions.

12. An apparatus for wireless communication at a first user equipment (UE), comprising:
    a memory; and
    at least one processor coupled to the memory and configured to:
        determine, based on a rule, a default uplink transmit beam for transmitting an uplink transmission when an uplink transmit beam for the uplink transmission is not configured, wherein the default uplink transmit beam corresponds to a beam used for receiving a downlink transmission, wherein parameters for the default uplink transmit beam correspond to the beam, and wherein the determining of the default uplink transmit beam includes selecting a beam associated with a control resource set (CORESET) having a lowest CORESET identifier; and
        transmit, to a base station, the uplink transmission on the default uplink transmit beam.

13. A method of wireless communication at a base station, comprising:
    transmitting, to a user equipment (UE), a downlink transmission on a downlink beam;
    selecting a beam to monitor for receiving an uplink transmission, wherein parameters of the selected beam correspond to the downlink beam, and wherein the selecting of the beam to monitor for receiving the uplink transmission is based on the beam associated with a control resource set (CORESET) having a lowest CORESET identifier; and receiving, from the UE, the uplink transmission on a default uplink transmit beam when the base station has not configured an uplink transmit beam for the uplink transmission.

14. The method of claim 13, wherein the uplink transmission comprises at least one of an uplink control channel, a sounding reference signal (SRS), or a scheduling request (SR).

15. The method of claim 14, wherein the selecting of the beam to monitor for receiving the uplink transmission includes selecting a first beam for receiving the uplink control channel, the method further comprising:

selecting a second beam for receiving the SRS.

16. The method of claim 15, wherein the first beam is the same as the second beam.

17. The method of claim 13, wherein the CORESET includes the lowest CORESET identifier in a slot last monitored by the UE.

18. The method of claim 13, wherein the CORESET includes the lowest CORESET identifier among a set of configured CORESETS.

19. The method of claim 13, further comprising transmitting a CORESET identifier for the CORESET via at least one of a radio resource control (RRC) or a medium access control-control element (MAC-CE).

20. The method of claim 13, wherein the downlink transmission is a downlink shared channel, and the selected beam further corresponds to a lowest transmission configuration indication (TCI) state identifier of activated TCI states associated with the downlink shared channel.

21. The method of claim 13, wherein the downlink transmission is a downlink shared channel, and the selected beam further corresponds to a transmission configuration indication (TCI) state identifier of TCI states associated with the downlink shared channel.

22. The method of claim 13, wherein the downlink transmission is a downlink shared channel, and the selected beam further corresponds to a last successfully received downlink shared channel beam after a threshold period.

23. The method of claim 13, wherein the selecting of the beam to monitor for receiving the uplink transmission is further based on the beam indicated in downlink control information (DCI).

24. The method of claim 13, wherein the base station communicates using a plurality of transmit-receive points (TRPs), and wherein for each TRP, the selecting of the beam to monitor for receiving the uplink transmission is based on the corresponding downlink beam.

25. The method of claim 13, wherein the downlink transmission includes default uplink spatial relation information for determining the default uplink transmit beam, the method further comprising:

selecting a beam to monitor for receiving a plurality of uplink transmissions based on the default uplink spatial relation information.

26. An apparatus for wireless communication at a base station, comprising:

a memory; and at least one processor coupled to the memory and configured to:

transmit, to a user equipment (UE), a downlink transmission on a downlink beam;

select a beam to monitor for receiving an uplink transmission, wherein parameters of the selected beam correspond to the downlink beam, and wherein the selecting of the beam to monitor for receiving the uplink transmission is based on the beam associated with a control resource set (CORESET) having a lowest CORESET identifier; and receive, from the UE, the uplink transmission on a default uplink transmit beam when the base station has not configured an uplink transmit beam for the uplink transmission.

* * * * *